Patented July 7, 1942

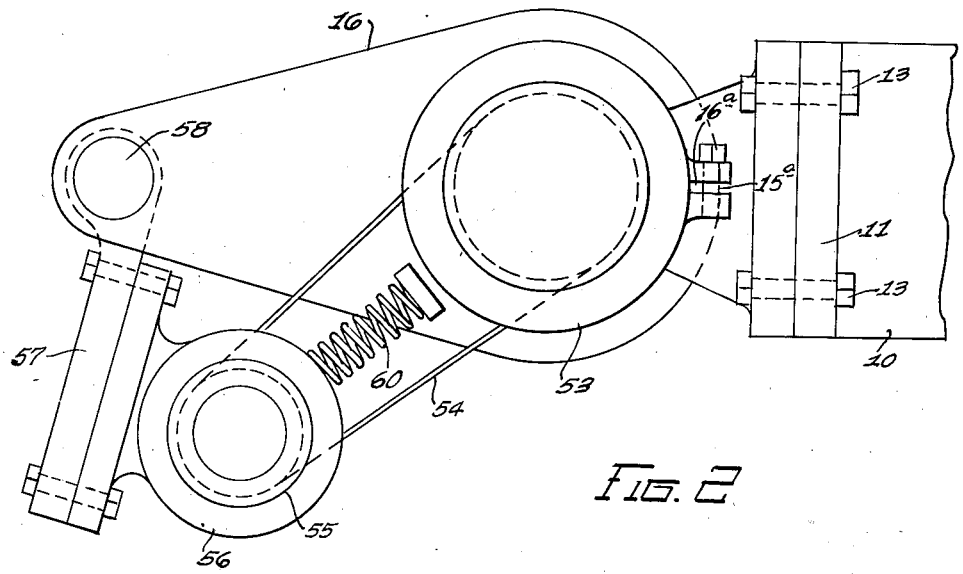
Fig. 2
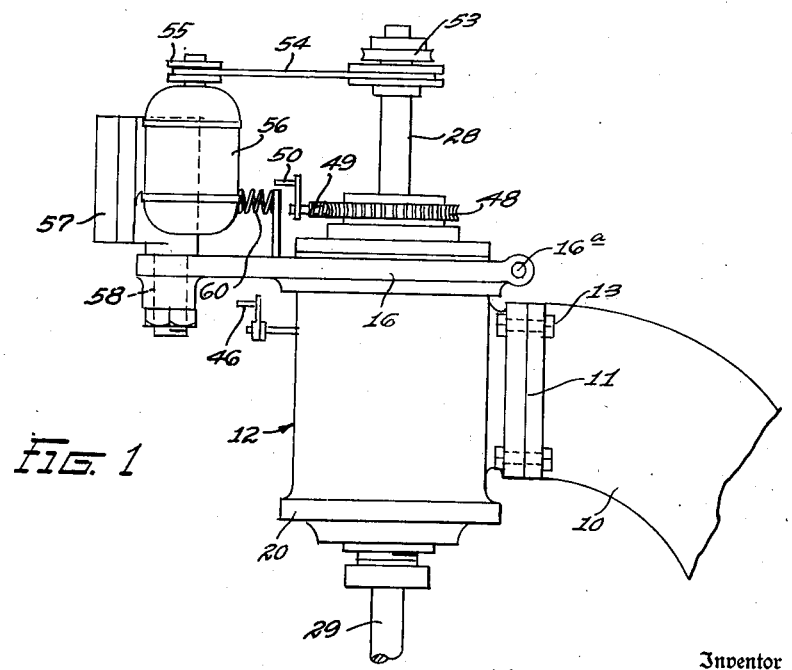
Fig. 1

2,289,111

UNITED STATES PATENT OFFICE 2,289,111

TOOL CARRIER

Matthew J. Fett, Detroit, Mich.

Application December 2, 1940, Serial No. 368,207

2 Claims. (Cl. 90—15)

This invention relates generally to machine tools and more particularly to a tool carrier or head.

It is an object of the present invention to provide a new and improved tool carrier or head having provisions for adjusting the position of the tool or to cause the tool to travel various paths during the cutting operation thereof.

Another object of the invention is to provide a new and improved tool carrier or head which is particularly adapted for high speed milling operations.

Another object of the invention is to provide for milling and other machines a new and improved movable tool carrier or head to replace the well known movable work support or rotary table which carrier prevents resetting of work between different operations and is more easily and conveniently operated than a movable work support or rotary table.

A further object of the invention is to provide a new and improved tool carrier or head which is of rigid construction.

Other objects of the invention will become apparent from the following detailed description taken in connection with the accompanying drawings in which:

Figure 1 is a fragmentary side elevational view of a machine including the improved tool carrier or head;

Figure 2 is a fragmentary top plan view of the machine;

Figure 3:
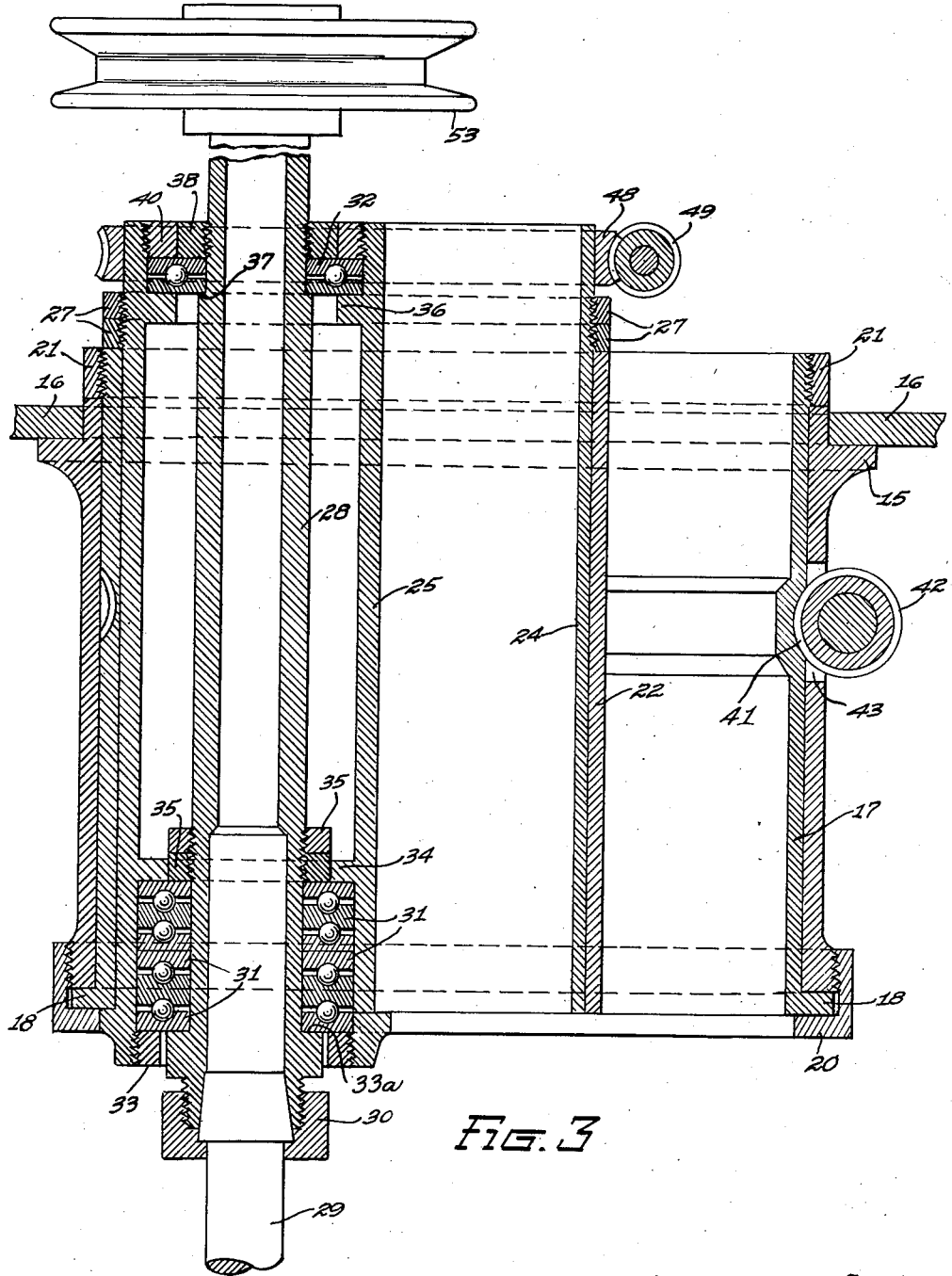
Figure 3 is a vertical central sectional view of my improved tool carrier or head.
Figure 4:
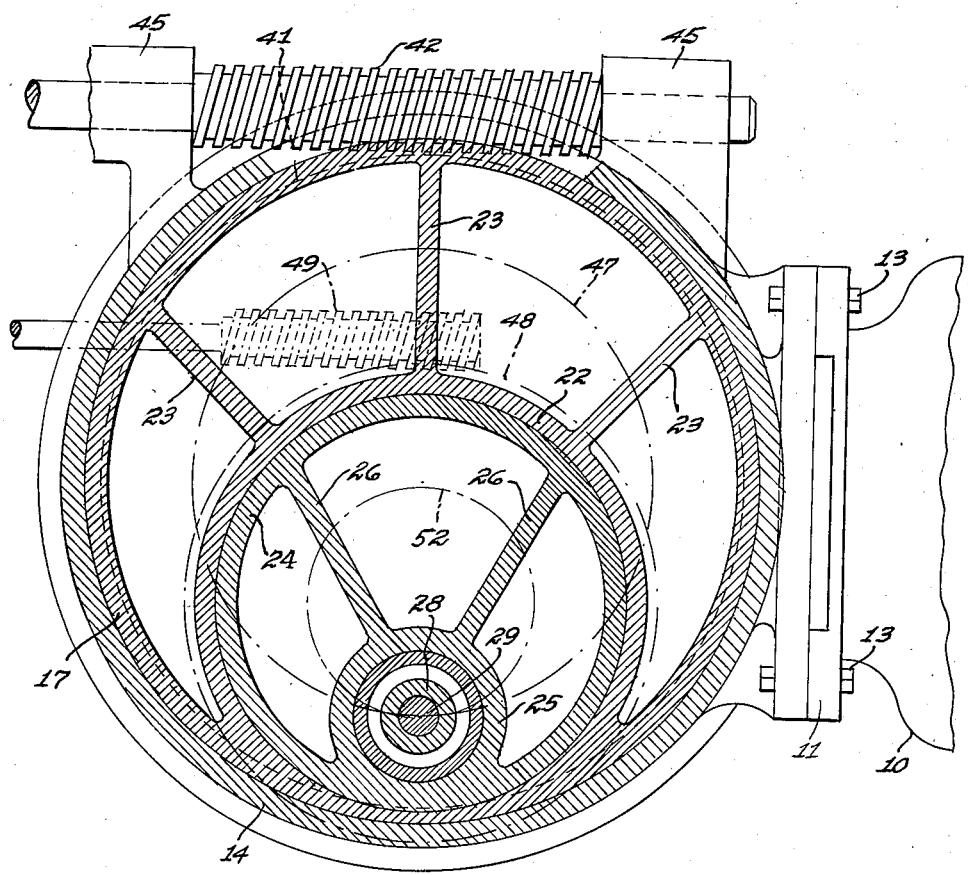
Figure 4 is a cross sectional view of the tool carrier or head.
Figure 5:
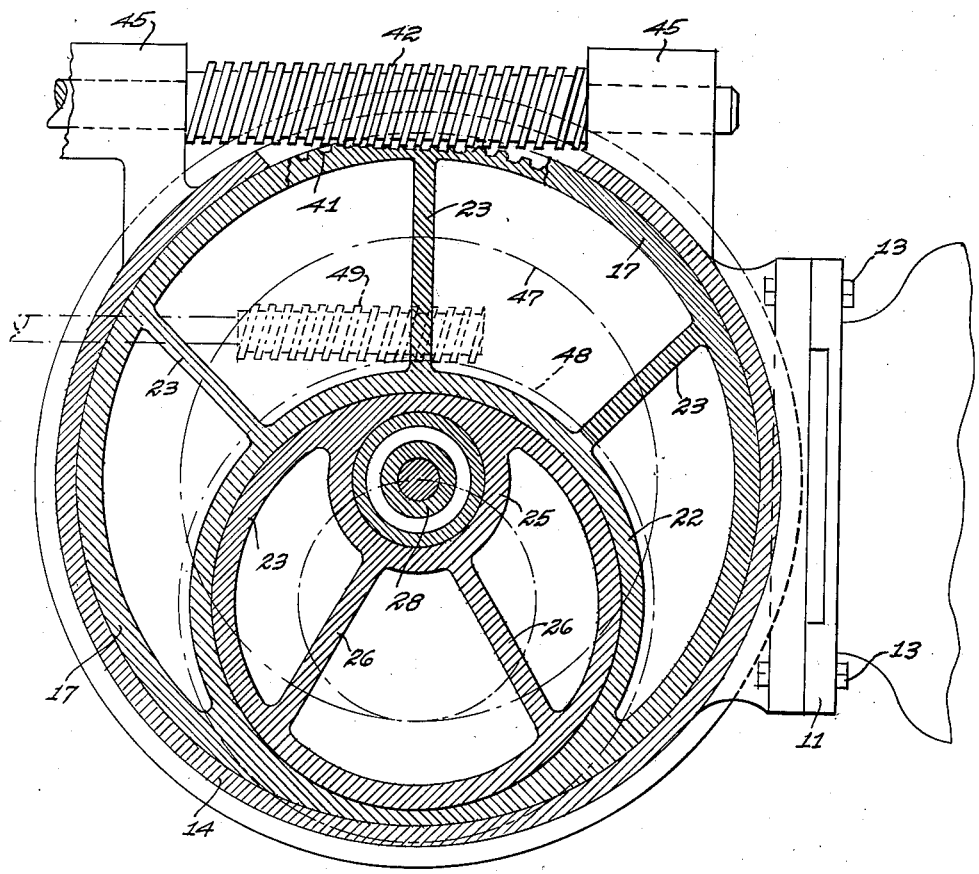
Figure 5 is a view similar to Figure 4 showing the tool in another position.

Referring to the drawings by characters of reference, the machine includes an upright or frame 10 of any suitable design having a flanged, vertical mounting face 11 to which the head or tool carrier 12 is rigidly secured, such as by bolts 13. The head 12 includes an outer cylindrical casing 14, preferably a casting which is open at opposite ends thereof, the casing 14 being provided adjacent its upper end with an external, annular flange 15 on which a supporting plate 16 seats. The supporting plate 16 is apertured to fit over the upper end of the casing and is split, as at 15ª, Figure 2, having spaced lugs apertured to receive a screw 16ª for tightly clamping the plate to the casing.

Disposed within and concentric with the casing 14 there is an open ended cylindrical member or sleeve 17 which fits snugly in the casing and is provided at its lower end with an outturned flange 18 which abuts against the lower end of the casing 14. An internally threaded clamping ring 20 is screw-threaded onto the lower end of the casing 14 and, abutting the underside of the flange 18, is adapted to secure the cylindrical member 17 releasably to the casing 14. At its upper end, the sleeve 17 is externally threaded to receive an internally threaded ring 21 which when tightened down seats against the upper end of the casing 14 to aid the clamping ring 20 to hold the sleeve 17 tightly against accidental rotation relative to the casing 14. However, upon release of the lower clamping ring 20, the sleeve 17 will be free to rotate relative to the casing 14.

Integral with the cylindrical member 17 and eccentrically arranged with respect thereto is an inner cylindrical member or sleeve 22 which is joined to the outer cylindrical member by spaced, vertically extending webs 23. Rotatably mounted within the sleeve 22 and concentric therewith is another sleeve 24 which fits snugly in the sleeve 22 and carries a vertically extending cylindrical member or innermost sleeve 25. The sleeve 25 is eccentrically arranged with respect to the member 24 and is joined thereto by spaced, vertically extending ribs or webs 26. Adjacent its upper end, the member 24 is externally threaded to receive a pair of internally threaded locking rings 27, Figure 3 the lower of which seats on the upper end of the member 22.

Rotatably mounted within the cylindrical member 25 there is a spindle 28, to the lower end of which is secured a tool 29 which, for example, may be a milling cutter or any other type of tool. The tool 29 is held to the spindle by a nut 30 which is screw-threaded onto the lower and preferably tapered end of the spindle. Preferably, the spindle 28 is journalled on a plurality of ball bearings 31 which are mounted in the cylindrical member 25 adjacent the lower end thereof and the spindle 28 is also journalled on one or more upper ball bearings 32 arranged adjacent the upper end of the cylindrical member 25. A ring-like nut 33 surrounds the spindle 28 and screwthreads into the lower end of the cylindrical member 25 to aid in supporting the ball bearings which are supported in part by an upwardly facing external shoulder 33ª provided on the spindle 28. Upward movement of the ball bearings 31 is limited by an internal shoulder 34 of the cylindrical member 25 and by a pair of lock nuts 35 which screwthread onto the spindle and seat on the uppermost race of the set of bearings. The bearing 32 seats on an internal annular shoulder 36 of the cylindrical member or sleeve 25 and also seats on an upwardly facing shoulder 37 provided on the spindle 28, the bearing 32 being held in place or held down by a nut 38 screwthreaded onto the spindle 28 and by a nut 40 screwthreaded into the upper end of the cylindrical member or sleeve 25.

The sleeve member 17 is provided externally thereof with a worm wheel 41 which extends around the sleeve and meshes with a worm gear 42 which projects through a clearance aperture 43 provided in the side wall of the casing 14. The worm gear 42 is rotatably supported by spaced supports or lugs 45 which may be cast integral with the casing 14. The worm gear 42 may be manually operated by a crank 46 secured thereto and, through operation of the worm wheel 41, cause sleeve 17 to rotate and move the spindle 28 and tool 29 bodily through the circular path represented by the dash and dot line 47. Rigidly secured to the upper end of the sleeve 24 there is a worm wheel 48 which meshes with a worm gear 49 which may be manually operated by a crank 50. It will be seen that through rotation of the worm wheel 48 the sleeve 24 may be rotated, causing the tool 29 to travel the circular path represented by the dot and dash line 52. It will also be seen that cranks 46 and 50 may be so operated together as to cause the tool 29 to follow any desired path regular or irregular within the confines of the larger circle 47.

Rigidly secured on and to the spindle 28, above the worm wheel 48, there is a stepped pulley 53 which is driven by a belt 54 from a drive pulley 55 which in turn is driven by an electric motor 56. The motor 56 is mounted on a swivel support or bracket 57 having a vertical pivot pin 58 received in an aperture in the supporting plate 16, which plate, as previously mentioned, is rigidly secured to the casing 14. A helical coil spring 60 is provided having one end attached to the motor 56 and having its other end anchored to the plate 16. This spring 60 is of the compression type and acts to maintain the proper axial distance between the spindle 28 and the motor 56 when the spindle 28 is moved bodily by either of the worm gears 42 or 49, thereby eliminating slack in the belt 54.

In operation, the tool 29 is driven by the electric motor 56 and accidental movement of the tool bodily is prevented by the worm gears 42 and 49 meshing respectively with the worm wheels 41 and 48. However, if it is desired to move the tool bodily to perform a certain milling or other operation, this can be accomplished either by rotating the inner sleeve 24 by means of the crank 50 or by rotating the outer sleeve 17 by means of the crank 46, or both. To rotate the outer sleeve 17 it is necessary to release the clamping ring 20. It will be seen that in view of the eccentric arrangements of the sleeves that the tool 29 may be caused to follow either of the circular paths or may be moved through any desired path within the area of the larger dot and dash circle 47 or the tool may be adjusted to any position within said area.

While I have shown and described my invention in detail, it is to be understood that the same is to be limited only by the appended claims for many changes may be made without departing from the spirit and scope of the invention.

What I claim is:

1. A tool carrier comprising a cylindrical support having an internal cylindrical surface, a rotary sleeve mounted in said cylindrical surface, a radially extending flange formed on the sleeve to engage the support and prevent displacement thereof, an eccentric sleeve having a peripheral portion integrated with the sleeve, radially extending webs connecting the eccentric sleeve to the rotary sleeve, a second rotary sleeve mounted within the first-mentioned eccentric sleeve, a second eccentric sleeve mounted within the second rotary sleeve, a tool spindle rotatably supported by the second-mentioned eccentric sleeve and radially extending reinforcing webs for the respective rotary and eccentric sleeves emanating from the axis of each eccentric sleeve, whereby the strains and stresses of said tool spindle will be taken up in all positions of the spindle.

2. A tool carrier comprising a non-rotatable support having an inner cylindrical surface, a rotatable sleeve mounted within said cylindrical surface, an eccentric sleeve spaced from the rotatable sleeve and connected thereto by radial extending web portions emanating from the axis of the eccentric sleeve, a rotary sleeve mounted in said eccentric sleeve and a second eccentric sleeve formed in the last mentioned rotary sleeve and spaced therefrom by radial web portions emanating from the axis of said last-mentioned eccentric sleeve whereby the lateral stresses between said sleeves will be equally absorbed and a tool spindle rotatably mounted in the last mentioned eccentric sleeve capable of hypocycloidal movement.

MATTHEW J. FETT.